US008999052B2

(12) United States Patent
Yabe et al.

(10) Patent No.: US 8,999,052 B2
(45) Date of Patent: Apr. 7, 2015

(54) METHOD FOR PRODUCING FINE MESOPOROUS SILICA PARTICLES, FINE MESOPOROUS SILICA PARTICLES, LIQUID DISPERSION OF FINE MESOPOROUS SILICA PARTICLES, COMPOSITION CONTAINING FINE MESOPOROUS SILICA PARTICLES AND MOLDED ARTICLE CONTAINING FINE MESOPOROUS SILICA PARTICLES

(75) Inventors: Hiroki Yabe, Osaka (JP); Takeyuki Yamaki, Nara (JP); Yasuto Hoshikawa, Miyagi (JP); Tatsuya Okubo, Tokyo (JP); Atsushi Shimojima, Tokyo (JP)

(73) Assignees: Panasonic Corporation, Kadoma-shi (JP); The University of Tokyo, Tokyo (JP)

( * ) Notice: Subject to any disclaimer, the term of this patent is extended or adjusted under 35 U.S.C. 154(b) by 210 days.

(21) Appl. No.: 13/389,095

(22) PCT Filed: May 18, 2010

(86) PCT No.: PCT/JP2010/058367
§ 371 (c)(1),
(2), (4) Date: Apr. 17, 2012

(87) PCT Pub. No.: WO2011/016277
PCT Pub. Date: Feb. 10, 2011

(65) Prior Publication Data
US 2012/0192762 A1 Aug. 2, 2012

(30) Foreign Application Priority Data

Aug. 7, 2009 (JP) ................................. 2009-185014

(51) Int. Cl.
*C04B 41/50* (2006.01)
*C07F 7/18* (2006.01)
(Continued)

(52) U.S. Cl.
CPC ......... *C01B 33/193* (2013.01); *G02B 2207/107* (2013.01)

(58) Field of Classification Search
USPC .............................. 106/287.14, 287.1, 287.13
See application file for complete search history.

(56) References Cited

U.S. PATENT DOCUMENTS 7,868,198 B2 * 1/2011 Laine et al. ................... 556/460
2002/0046682 A1 * 4/2002 Fan et al. ................. 106/287.11
(Continued)

FOREIGN PATENT DOCUMENTS

JP 2001-233611 A 8/2001
JP 2004-083307 A 3/2004
(Continued)

OTHER PUBLICATIONS

Nandiyanto et al., Microporous and Mesoporous Materials, 120, 447-453, 2009.*
(Continued)

*Primary Examiner* — James McDonough
(74) *Attorney, Agent, or Firm* — Locke Lord LLP; James E. Armstrong, IV

(57) ABSTRACT

Fine mesoporous silica particles are provided by which not only the functions of low reflectance (Low-n), low dielectric constant (Low-k) and low thermal conductivity but also improved strength of a molded article are achieved. The fine mesoporous silica particles are manufactured by a process including a surfactant composite fine silica particle preparation step and a mesoporous particle formation step. In the silica fine particle preparation step, a surfactant, water, an alkali and a hydrophobic part-containing additive including a hydrophobic part for increasing the volume of micelles are mixed with a silica source to thereby prepare surfactant composite fine silica particles. In the mesoporous particle formation step, the mixture is mixed with an acid and an organosilicon compound to thereby remove the surfactant and hydrophobic part-containing additive from the surfactant composite fine silica particles and provide the surface of each silica fine particle with an organic functional group. The fine mesoporous silica particles have mesopores inside each particle, and are modified on the surface with organic functional groups.

10 Claims, 13 Drawing Sheets

(51) Int. Cl.
*C04B 41/49* (2006.01)
*C01B 33/193* (2006.01)

(56) References Cited

U.S. PATENT DOCUMENTS

| | | | |
|---|---|---|---|
| 2005/0025690 A1 | 2/2005 | Fukuda et al. | |
| 2005/0109238 A1* | 5/2005 | Yamaki et al. | 106/287.16 |
| 2006/0130855 A1* | 6/2006 | Luan et al. | 131/202 |
| 2008/0063979 A1* | 3/2008 | Tomita et al. | 430/287.1 |
| 2011/0048282 A1* | 3/2011 | Quijada Abarca et al. | 106/287.13 |
| 2012/0192762 A1* | 8/2012 | Yabe et al. | 106/287.14 |

FOREIGN PATENT DOCUMENTS

| | | |
|---|---|---|
| JP | 2005-047722 A | 2/2005 |
| JP | 2005-089240 A | 4/2005 |
| JP | 2006-069824 A | 3/2006 |
| JP | 2007-161518 A | 6/2007 |
| JP | 2009-040965 A | 2/2009 |
| JP | 2009-040966 A | 2/2009 |
| JP | 2009-040967 A | 2/2009 |
| JP | 2010-120812 A | 6/2010 |

OTHER PUBLICATIONS

Office Action dated Dec. 6, 2013, issued for the Japanese patent application No. 2010-114295.

Asep Bayu Dani Nandiyanto et al., "Synthesis of spherical mesoporous silica nanoparticles with nanometer-size controllable pores and outer diameters," Journal of Microporous and Mesoporous Materials 2009, vol. 120, pp. 447-453.

International Search Report dated Aug. 31, 2010, issued for PCT/JP2010/058367.

* cited by examiner

P1

P2

Q1

Q2

US 8,999,052 B2

METHOD FOR PRODUCING FINE MESOPOROUS SILICA PARTICLES, FINE MESOPOROUS SILICA PARTICLES, LIQUID DISPERSION OF FINE MESOPOROUS SILICA PARTICLES, COMPOSITION CONTAINING FINE MESOPOROUS SILICA PARTICLES AND MOLDED ARTICLE CONTAINING FINE MESOPOROUS SILICA PARTICLES

TECHNICAL FIELD

The present invention relates to a method for producing fine mesoporous silica particles, fine mesoporous silica particles, and a liquid dispersion, composition and molded article obtained using the fine mesoporous silica particles.

BACKGROUND ART

Conventionally, silica fine particles with a hollow structure such as that shown in Patent Document 1 have been known as fine particles providing low reflectance (Low-n) and low dielectric (Low-k) constants. Recently, there is demand for greater void ratios in order to achieve greater performance. However, it is difficult to reduce the thickness of the outer shell in fine hollow silica particles, and the void ratio is likely to decline for structural reasons if the particle size is reduced to 100 nm or less.

Under these circumstances, because the void ratios of fine mesoporous silica particles are unlikely to decline for structural reasons as the particle size is reduced, they hold promise as next-generation high-void-ratio fine particles for application to low-reflectance (Low-n), low-dielectric constant (Low-k) materials and materials with low thermal conductivity. A molded article having these functions can also be obtained by dispersing fine mesoporous silica particles in a resin or other matrix-forming material (see Patent Documents 2 to 6).

In order to prepare a molded article having the superior functions of fine mesoporous silica particles, the high-void-ratio fine mesoporous silica particles must be supported in the molded article. However, in conventional fine mesoporous silica particles the void volume is too low, so that if the mesoporous silica content is low the functions described above cannot be obtained in a molded article, while if the mesoporous silica content is high the strength of the molded article is diminished. There have been attempts to increase the void ratios fine mesoporous silica particle. For example, in Non-patent Document 1 the mesopores are enlarged by the addition of styrene or the like, increasing the void ratio of the particles. However, in this method the shape and arrangement of the mesopores is irregular, and the strength of the molded article may be reduced for reasons having to do with the strength of the particles.

[Patent Document 1] Japanese Patent Application Laid-open No. 2001-233611
[Patent Document 2] Japanese Patent Application Laid-open No. 2009-040965
[Patent Document 3] Japanese Patent Application Laid-open No. 2009-040966
[Patent Document 4] Japanese Patent Application Laid-open No. 2009-040967
[Patent Document 5] Japanese Patent Application Laid-open No. 2004-083307
[Patent Document 6] Japanese Patent Application Laid-open No. 2007-161518

[Non-patent Document 1] Microporous and Mesoporous Materials 120 (2009) 447-453

DISCLOSURE OF THE INVENTION

In light of these matters, it is an object of the present invention to provide a method for producing fine mesoporous silica particles, whereby the superior functions of low-reflectance (Low-n), low dielectric constant (Low-k) and low thermal conductivity can be achieved together with improved strength of a molded article. It is also an object to provide fine mesoporous silica particles, as well as a liquid dispersion, composition and molded article containing these fine mesoporous silica particles.

In order to solve the aforementioned problems, the present invention is configured as follows.

In the invention of a method for producing fine mesoporous silica particles, particles are produced by a process comprising: a surfactant composite fine silica particle preparation step in which a surfactant, water, an alkali and a hydrophobic part-containing additive including a hydrophobic part for increasing a volume of micelles are mixed with a silica source to thereby prepare surfactant composite fine silica particles; and a mesoporous particle formation step in which the surfactant composite fine silica particles are mixed with an acid and an organosilicon compound having a siloxane bond in a molecule to thereby remove the surfactant and hydrophobic part-containing additive from the surfactant composite fine silica particles and provide a surface of each silica fine particle with an organic functional group.

In this invention, the mesoporous particle formation step preferably comprises a step of mixing an acid and an organosilicon compound having a siloxane bond in the molecule into a reaction liquid containing the surfactant composite fine silica particles produced in the surfactant composite fine silica particle preparation step.

In the aforementioned organosilicon compound having a siloxane bond in the molecule, the number of siloxane bonds in the molecule is preferably 1.

It is desirable that the organosilicon compound having a siloxane bond in the molecule have a hydrophobic functional group, so as to provide the surfaces of the silica fine particles with hydrophobic functional groups in the mesoporous particle formation step. In this case, it is especially desirable to include hexamethyldisiloxane as the organosilicon compound having a siloxane bond in the molecule.

Also, the organosilicon compound having a siloxane bond in the molecule preferably has an alkyl chain with two or more linked carbon atoms.

Moreover, it is desirable that the organosilicon compound having a siloxane bond in the molecule have a hydrophilic functional group, so as to provide surfaces of the silica fine particles with hydrophilic groups in the mesoporous particle formation step.

It is also desirable that the organosilicon compound having a siloxane bond in the molecule have a reactive functional group, so as to provide the surfaces of the silica fine particles with reactive functional groups in the mesoporous particle formation step.

In the invention of fine mesoporous silica particles, the particles are obtained by the aforementioned method of producing fine mesoporous silica particles.

Alternatively, fine mesoporous silica particles of the present invention are particles with a particle diameter of 100 nm or less, which are provided with a plurality of mesopores 3.5 nm or more in diameter equally spaced inside each particle, and which are modified on a surface thereof with organic functional groups.

In this case, the particle surfaces of the fine mesoporous silica particles are preferably provided with a plurality of convexities.

These convexities are preferably made principally of silicon oxide.

The protruding height of these convexities is preferably at least 1 nm but not more than 30 nm.

The invention of a liquid dispersion of fine mesoporous silica particles comprises the aforementioned fine mesoporous silica particles dispersed in a medium.

The invention of a composition containing fine mesoporous silica particles comprises the aforementioned fine mesoporous silica particles contained in a matrix-forming material.

The invention of a molded article containing fine mesoporous silica particles is obtained by molding the aforementioned composition containing fine mesoporous silica particles.

With the method for producing fine mesoporous silica particles of the present invention, during the process of hydrolyzing an alkoxysilane under alkali conditions to form silica fine particles in the surfactant composite fine silica particle preparation step, micelles are formed as a basis for mesopores by the action of a surfactant in the silica, and the micelle diameter can be increased because a hydrophobic part-containing additive is incorporated into the micelles formed by the surfactant. In the mesoporous particle formation step, both the surfactant that formed the micelles in the silica and the hydrophobic part-containing additive inside the micelles are extracted and removed with an acid, while at the same time the siloxane bond of an organosilicon compound having a siloxane bond in the molecule is cleaved and activated by the acid, and condenses with a silanol group on the particle surface, allowing the particle surface to be modified with an organic functional group. It is thus possible to produce a fine mesoporous silica particle with a high void ratio because the mesopores in the resulting particle are enlarged without an increase in particle diameter. The particle surface can also be protected from water and acid, destruction of the mesopores due to hydrolysis of the siloxane framework can be inhibited, and because the surfaces of the fine mesoporous particles are covered with organic functional groups, aggregation of particles with each other can also be prevented, greatly improving dispersibility in media. Because such highly-dispersible, high-void-ratio fine mesoporous silica particles can confer functions on a molded article when added in smaller amounts than conventional particles, they are less likely to detract from the strength of a molded article.

With the fine mesoporous silica particles of the present invention, because the fine mesoporous silica particles have a particle diameter reduced by the manufacturing method described above, or have a small particle diameter of 100 nm or less, allowing fine particles to be packed at high densities in tiny spaces about 100 nm in size, they can be used in the interlayer insulating films of semiconductors and antireflective films, which are thin films requiring high performance, and can provide high-quality products with thin films. Because large mesopores are obtained by the aforementioned manufacturing method, or because the particles have large mesopores 3.5 nm or more in size, moreover, the void ratio is high, and strength is maintained because the mesopores are also equally spaced, allowing both a high void ratio and strength to be achieved in the same particle.

With the liquid dispersion of fine mesoporous silica particles of the present invention, an additive having the functions of low refractive index (Low-n), low dielectric constant (Low-k) and low thermal conductivity can be easily obtained.

With the composition containing fine mesoporous silica particles of the present invention, it is possible to obtain a composition capable of easily producing a molded article having low refractive index (Low-n), low dielectric constant (Low-k) and low thermal conductivity when molded by film-formation or injection molding.

With the molded article of fine mesoporous silica particles of the present invention, it is possible to obtain a molded article having the functions of low refractive index (Low-n), low dielectric constant (Low-k) and low thermal conductivity. Because they are highly dispersible, moreover, the fine mesoporous silica particles in the molded article are distributed uniformly in the matrix without irregularities, reducing variation in performance and providing a high-quality molded article, while if the matrix is transparent, the molded article can also be made transparent.

BEST MODE FOR CARRYING OUT THE INVENTION

Figure 1:
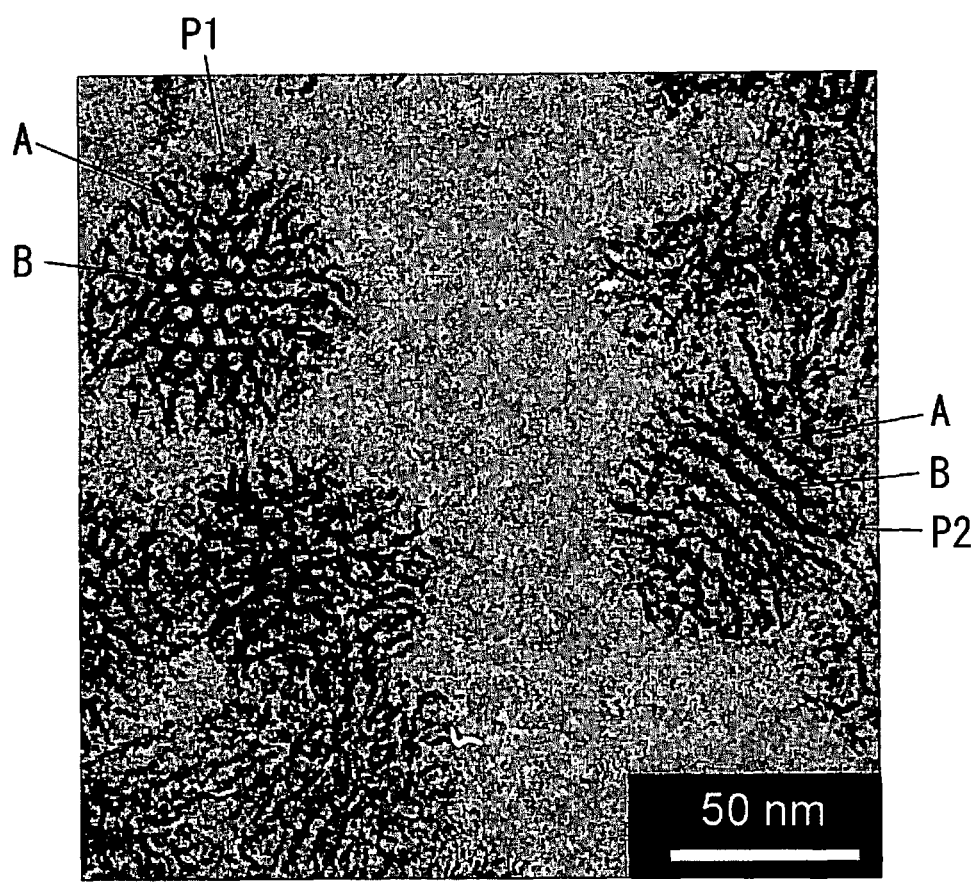
FIG. 1 is a TEM image of the fine mesoporous silica particles obtained in Example 2, as one example of the external appearance of fine mesoporous silica particles of the present invention.

Embodiments of the present invention are explained below.
[Production of Fine Mesoporous Silica Particles]

In the method for producing fine mesoporous silica particles of the present invention, the first step is a "surfactant composite fine silica particle preparation step" whereby surfactant composite fine silica particles are prepared having mesopores in which surfactant micelles containing a hydrophobic part-containing additive are present as a template. The next step is the "mesoporous particle formation step", in which the surfactant and hydrophobic part-containing additive in the surfactant composite fine silica particles are removed, and the surfaces of the silica fine particles are provided with organic functional groups.

In the surfactant composite fine silica particle preparation step, a liquid mixture is first prepared comprising a surfactant, water, an alkali, a hydrophobic part-containing additive including a hydrophobic part for increasing the volume of micelles, and a silica source.

Any suitable silica source (silicon compound) capable of forming fine mesoporous silica particles can be used as the silica source. Examples include silicon alkoxides, and specific examples include the tetraalkoxysilanes such as tetramethoxysilane, tetraethoxysilane, tetrapropoxysilane. Of these, it is particularly desirable to use tetraethoxysilane (Si(OC$_2$H$_5$)$_4$) because it allows good fine mesoporous silica particles to be prepared with ease.

The silica source preferably contains an alkoxysilane having an organic functional group. Using such an alkoxysilane, it is possible to form a silica framework out of alkoxysilyl groups while disposing organic functional groups on the surfaces of the fine particles. Since these organic functional groups react with the resin to form chemical bonds when the fine particles are made into a composite with a resin, it is easy to manufacture fine mesoporous silica particles that enhance the strength of a molded article. It is also possible to confer suitable properties on the fine mesoporous silica particles by chemically modifying the organic functional group with another organic molecule or the like.

The alkoxysilane having an organic functional group may be any capable of yielding a surfactant composite fine silica particle when used as a component of the silica source, without any particular limitations, but examples include alkoxysilanes comprising alkyl, aryl, amino, epoxy, vinyl, isocyanate, mercapto, sulfide, ureido, methacryloxy, acryloxy and styryl groups and the like as organic groups. Of these, an amino group is preferred, and a silane coupling agent such as aminopropyl triethoxysilane can be used by preference. Surface modification via an amino group can be accomplished for example by a reaction with a modifying agent having an isocyanate group, epoxy group, vinyl group, carbonyl group, Si—H group or the like.

A cationic surfactant, anionic surfactant, non-ionic surfactant or triblock copolymer can be used as the surfactant, but it is desirable to use a cationic surfactant. The cationic surfactant is not particularly limited, but octadecyl trimethyl ammonium bromide, hexadecyl trimethyl ammonium bromide, tetradecyl trimethyl ammonium bromide, dodecyl trimethyl ammonium bromide, decyl trimethyl ammonium bromide, octyl trimethyl ammonium bromide, hexyl trimethyl ammonium bromide and other quaternary ammonium salt-type cationic surfactants are especially desirable because they allow easy preparation of good fine mesoporous silica particles.

The mixing ratio of the silica source and surfactant is not particularly limited, but a weight ratio of 1:10 to 10:1 is preferred. If the amount of surfactant is outside this range relative to the silica source, the structure of the product may be less regular, and it may be difficult to obtain fine mesoporous silica particles with a regular arrangement of mesopores.

The hydrophobic part-containing additive is an additive having a hydrophobic part that has the effect of enlarging the volume of the micelles formed by the surfactant as described above. By including a hydrophobic part-containing additive, it is possible to obtain fine mesoporous silica particles with large mesopores because this additive increases the volume of the micelles when it is incorporated into the hydrophobic part of the surfactant micelles in the course of the alkoxysilane hydrolysis reaction. The hydrophobic part-containing additive is not particularly limited, but examples in which the entire molecule is hydrophobic include alkylbenzenes, long-chain alkanes, benzene, napthalene, anthracene, cyclohexane and the like, while examples in which part of the molecule is hydrophobic include block copolymers and the like, but methylbenzene, ethylbenzene, isopropylbenzene and other alkylbenzenes are particularly desirable because they are easily incorporated into the micelles and more likely to enlarge the mesopores. Using methylbenzene, moreover, it is easy to form convexities on the surfaces of the fine particles as discussed below.

The technique of adding a hydrophobic additive to enlarge mesopores when preparing a mesoporous material is describe in the prior documents J. Am. Chem. Soc. 1992, 114, 10834-10843 and Chem. Mater. 2008, 20, 4777-4782. However, in the manufacturing method of the present invention, fine mesoporous silica particles are obtained with a higher void ratio by enlarging the mesopores while maintaining fine particles with good dispersibility suited to a precision device by using methods such as those described above.

The amount of the hydrophobic part-containing additive in the liquid mixture is preferably at least three times the ratio of the amounts of substances with regard to (or the molar amount of) the surfactant. It is thus possible to obtain mesopores of sufficient size, and to easily prepare fine particles with a higher void ratio. If the amount of the hydrophobic part-containing additive is less than three times the molar amount of the surfactant, the mesopores may not be sufficiently large. If an excess of the hydrophobic part-containing additive is included, however, the excess hydrophobic part-containing additive will not be incorporated into the micelles, and is unlikely to have much effect on the fine particle reaction, so although there is no particular upper limit on the amount of the hydrophobic part-containing additive, it is preferably not more than 100 times the amount of surfactant from the standpoint of efficiency of the hydrolysis reaction. At least three but not more than 50 times is preferred.

The liquid mixture preferably contains an alcohol. By including an alcohol in the liquid mixture, it is possible to control the size and shape of the polymer when polymerizing the silica source, producing fine particles that are nearly spherical and uniform in size. The size and shape of the particles are likely to be irregular when an alkoxysilane with an organic functional group is used as the silica source in particular, so by including an alcohol in this case it is possible to prevent deviations in shape and the like caused by the organic functional group, and to standardize the size and shape of the particles.

According to a prior document, Microporous and Mesoporous Materials 93 (2006), 190-198, fine mesoporous silica particles with different shapes can be prepared using various alcohols. However, in the method of this document the mesopores are insufficiently large, and fine particles cannot be formed with a high void ratio. In the present invention, by contrast, although particle growth is inhibited when an alcohol is added to a mixture such as that described above, it is still possible to obtain fine particles with large mesopores.

The alcohol is not particularly limited, but a polyvalent alcohol with two or more hydroxyl groups is desirable for obtaining good control of particle growth. A suitable polyvalent alcohol can be used, but for example ethylene glycol, glycerin, 1,3-butylene glycol, propylene glycol, polyethylene glycol or the like is preferred. The mixed amount of the alcohol is not particularly limited, but is preferably about 1000 to 10,000 mass % of the silica source.

Next, in the surfactant composite fine silica particle preparation step, the liquid mixture is mixed and agitated to prepare surfactant composite fine silica particles. Mixing and agitation causes a hydrolysis reaction of the silica source by means of the alkali, polymerizing the mixture. In preparing the aforementioned liquid mixture, the liquid mixture can also be prepared by adding the silica source to a liquid mixture comprising a surfactant, water, an alkali and a hydrophobic part-containing additive.

An inorganic or organic alkali suitable for synthesizing surfactant composite fine silica particles can be used as the alkali in the reaction. Of these, an ammonium (nitrogenous alkali) or amine alkali is preferred, and it is especially desirable to use highly reactive ammonia. When using ammonia, ammonia water is preferred from a safety standpoint.

The mixing ratio of the silica source and the dispersion solvent (including water and in some cases alcohol) in the liquid mixture is preferably 5 to 1000 parts by weight of dispersion solvent per 1 part by weight of the condensed compound obtained by hydrolysis of the silica source. If the amount of dispersion solvent is less than this, the silica source may be too concentrated, increasing the reaction rate and making it difficult to stably form regular meso-structures. If the amount of the dispersion solvent is above this range, on the other hand, the yield of fine mesoporous silica particles may be very low, which is impractical from a manufacturing standpoint.

Once surfactant composite fine silica particles have been prepared in the surfactant composite fine silica particle preparation step, the surfactant and hydrophobic part-containing additive are removed from the surfactant composite fine silica particles, while at the same time the surfaces of the silica fine particles are provided with organic functional groups in the mesoporous particle formation step. At the same time here means in the same process. Removing the surfactant and hydrophobic part-containing additive empties the mesopores to produce fine mesoporous silica particles. One way to remove a surfactant and hydrophobic part-containing additive constituting the template of surfactant composite fine silica particles is by baking the surfactant composite fine silica particles at a temperature that decomposes the template, but in the present mesoporous particle formation step the template is removed by acid extraction. By mixing the acid with an organosilicon compound having a siloxane bond in the molecule, moreover, it is possible to activate the siloxane bond of the organosilicon compound by a cleavage reaction, whereupon the activated organosilicon compound binds with reactive silanol groups exposed on the silica surface by removal of the template, thereby modifying the surfaces of the silica fine particles with organic functional groups. That is, silicon having organic functional groups is introduced onto the surfaces of silica fine particles via siloxane bonds, introducing the organic functional groups by silylation. This introduction of organic functional groups serves to cover the particle surfaces, protecting them from acid and preventing the mesopores from being destroyed by acid, as well as inhibiting particle aggregation, which may occur due to condensation of silanol groups between particles.

The organosilicon compound having a siloxane bond in the molecule may be any in which the siloxane bond in the molecule is cleaved by acid, without any particular limitations. Preferably, the organic functional group part of the organosilicon compound is not decomposed by acid. Examples of such organosilicon compounds having siloxane bonds include silicone oils having methyl groups introduced as organic groups, and modified silicone oils having introduced organic groups other than methyl groups. Examples of functional groups other than methyl groups include alkyl groups with two or more linked carbon atoms, aryl, carboxyl, carbinol, amino, epoxy, alkylene, mercapto, sulfide, ureido, methacryloxy, acryloxy, styryl, hydroxyalkyl and polyether groups, and functional groups comprising these functional groups with fluorine substituted for hydrogen in a hydrocarbon (fluorinated organic groups).

In a preferred embodiment, the organosilicon compound having a siloxane bond in the molecule has a hydrophobic functional group. In this case, the surfaces of the silica fine particles can be provided with hydrophobic functional groups in the mesoporous particle formation step. That is, the hydrophobic functional group is a functional group with low affinity for water, such as a functional group with little electron bias and low polarity or an organic functional group that has been fluorinated, and hydrophobic functional groups can be arranged on the particle surfaces by means of the hydrophobic functional groups of the organosilicon compound, thereby improving dispersibility in hydrophobic dispersion media and resins. The hydrophobic functional group is not particularly limited as long as it is a hydrophobic organic functional group or other functional group with little electron bias in the functional group or a fluorinated organic functional group, but examples include alkyl, aryl, styryl and fluoroalkyl groups and the like.

In a preferred embodiment, the organosilicon compound having a siloxane bond in the molecule has a hydrophilic functional group. In this case, the surfaces of the silica fine particles can be provided with hydrophilic groups in the mesoporous particle formation step. That is, the hydrophilic functional group is a functional group with a large electron bias and high polarity or another functional group with high affinity for water, and hydrophilic groups can be arranged on the particle surfaces by means of the hydrophilic functional groups of the organosilicon compound, thereby improving dispersibility in hydrophilic dispersion media and resins. The hydrophilic functional group is not particularly limited as long as it is a functional group with high polarity and a large electron bias in the functional group or another functional group with high affinity for water, but examples include carboxyl, carbinol, amino, epoxy, alkylene, mercapto, sulfide, ureido, methacryloxyl, acryloxy, hydroxyalkyl and polyether groups, as well as those in which these high-polarity functional groups have been substituted for part of a low-polarity functional group.

In the organosilicon compound having a siloxane bond in the molecule, the number of siloxane bonds is preferably 1. In this case, because one active part remains in the cleaved, activated compound after the siloxane bond has been cleaved and activated with acid, there is little risk of polymerization of the organosilicon compound with itself such as occurs when there are multiple active parts, and the organic functional groups are more likely to cover the particle surfaces uniformly.

The organosilicon compound having a siloxane bond in the molecule may also comprise hexamethyl disiloxane. In this case, methyl groups can be arranged on the particle surfaces by means of the hexamethyl disiloxane. Because with hexamethyl disiloxane there is little steric hindrance of the trimethylsilyl groups added to the particle surfaces, methyl groups can be introduced efficiently onto the particle surfaces.

The organosilicon compound having a siloxane bond in the molecule may also have an alkyl chain with two or more linked carbon atoms. In this case, because the alkyl chain with two or more linked carbon atoms is introduced onto the particle surfaces, dispersibility of the particles in dispersion media and resins can be improved because of the repulsion of alkyl chains between particles. There is no particular upper limit on the number of linked carbon atoms, but 30 or fewer carbon atoms are preferred for ease of use in the reaction system.

The organosilicon compound having a siloxane bond in the molecule may also have a reactive functional group. This allows reactive functional groups to be arranged on the particle surfaces, forming chemical bonds with the resin material and allowing a strong molded article to be prepared. The reactive functional group is not particularly limited, but examples include carboxyl, carbinol, amino, epoxy, alkylene, mercapto, sulfide, ureido, methacryloxy, acryloxy and hydroxyalkyl groups and the like.

The mesoporous particle formation step may also be performed using multiple compounds with different organic functional groups for the organosilicon compound having a siloxane bond in the molecule. Mixing organic functional groups with different properties together allows multiple types of organic functional groups to be introduced onto the surfaces of the fine particles, making it possible to control the reactivity of the fine mesoporous silica particle surfaces and the dispersibility of the particles in the medium. Amphiphilic fine particles can be obtained by introducing both a hydrophilic organic functional group and a hydrophobic organic functional group on the surfaces of fine particles, allowing for dispersion in a variety of media.

The acid that is mixed with the organosilicon compound having a siloxane bond in the molecule can be any that has the effect of cleaving the organosilicon compound having a siloxane bond in the molecule, and for example hydrochloric acid, nitric acid, sulfuric acid, hydrogen bromide or the like can be used. The acid is preferably compounded in such a way that the pH of the reaction liquid is less than 7 in order to expedite surfactant extraction and cleavage of the organosilicon compound having a siloxane bond in the molecule.

A suitable solvent is preferably used when mixing the acid and the organosilicon compound having a siloxane bond in the molecule. Using a solvent facilitates mixing. An alcohol with amphiphilic properties is preferably used as the solvent in order to reconcile the hydrophilic silica nanoparticle with the hydrophobic organosilicon compound having a siloxane bond in the molecule. For example, isopropanol may be used.

The reaction between the acid and the organosilicon compound having a siloxane bond in the molecule can be performed in the liquid produced by the synthesis reaction of the surfactant composite fine silica particles, using the reaction as is. This means that there is no need to separate and collect the particles from the liquid after synthesis of the surfactant composite fine silica particles, and the manufacturing process can be simplified because the separation and collection step can be omitted. The operations of removing the surfactant and hydrophobic part-containing additive and modifying with organic functional groups can be performed using the liquid mixture after the reaction, thereby simplifying manufacture of the fine mesoporous silica particles and moreover accomplishing significant improvement in the production efficiency of the fine mesoporous silica particles. Since there is no separation and collection step, moreover, the surfactant composite fine silica particles can react uniformly without causing aggregation, and it is possible to obtain fine mesoporous silica particles in a fine particle state.

In the mesoporous particle formation step, the acid and organosilicon compound having a siloxane bond in the molecule can be mixed into the reaction liquid of the surfactant composite fine silica particles, and agitated for about 1 minute to 50 hours with heating at about 40 to 150° C. to thereby extract surfactant from the mesopores by the acid while at the same time causing a cleavage reaction of the organosilicon compound having a siloxane bond in the molecule by the acid, activating the bond and modifying the mesopores and particle surfaces with organic functional groups.

The surfaces of the surfactant composite fine silica particles preferably have functional groups that are not silylated when mixed with the acid and organosilicon compound having a siloxane bond in the molecule. Since functional groups that are not silylated remain on the surfaces of the fine mesoporous silica particles, the surfaces of the fine mesoporous silica particles can be easily treated with or form chemical bonds with a substance that reacts with these functional groups. It is thus easy to accomplish a surface treatment reaction in which chemical bonds are formed by a reaction between the fine mesoporous silica particles and functional groups in the resin forming the matrix. Such functional groups can be obtained by including them in the silica source in the surfactant composite fine silica particle preparation step.

The functional groups that are not silylated when mixed with an acid and an organosilicon compound having a siloxane bond in the molecule are not particularly limited, but are preferably amino, epoxy, vinyl, isocyanate, mercapto, sulfide, ureido, methacryloxy, acryloxy or styryl groups or the like.

The fine mesoporous particles prepared in the mesoporous particle formation step can be collected by centrifugation, filtration or the like and then dispersed in a medium, or subjected to media exchange by dialysis or the like and used in a liquid dispersion, composition or molded article.

[Fine Mesoporous Silica Particles]

The fine mesoporous silica particles are obtained by the method described above, and preferably have a particle diameter of 100 nm or less. They can thus be easily incorporated into a device structure requiring a low refractive index (Low-n), low dielectric constant (Low-k) and low thermal conductivity, and the fine particles can be packed densely inside the device. If the diameter of the fine mesoporous silica particles is greater than this, they may not be highly packable. The lower limit of the particle diameter of the fine mesoporous silica particles is effectively 10 nm. The particle diameter is preferably 20 to 70 nm.

The pore diameter of the mesopores is preferably 3.5 nm or more, and multiple mesopores are preferably formed with equal spacing in the interior of each fine mesoporous particle. Because the mesopores are equally spaced, strength is not affected when a composition containing the fine mesoporous particles is molded, as happens when the mesopores are unevenly distributed, so a uniform strength can be maintained while achieving a sufficiently high void ratio. If the diameter of the mesopores is less than 3.5 nm, sufficient voids may not be obtained. The mesopore diameter is preferably not more than 10 nm. If the diameter of the mesopores is greater than this, the voids may be too big, making the particles more fragile and detracting from the strength of a molded article. The diameter of the mesopores is preferably 4.0 nm or more. Equally spaced here does not mean completely equal spaced, and it is sufficient that the pores appear to be at substantially equal distances in TEM observation.

In addition to having mesopores inside the particles, the fine mesoporous silica particles preferably have multiple convexities on the particle surfaces. Mesopores are the pores normally present in fine mesoporous silica particles, which give the silica fine particles a porous structure that makes them a material with a low refractive index and low diametric constant, but greater density and a greater void ratio can be achieved by providing convexities in addition to the mesopores.

The convexities are formed by the protrusion of part of the particle components on the surface of the particles, and the wall surfaces that form the sides of the convexities are separate from the surfaces that form the mesopores. The convexities may be shaped as flat-topped protrusions, or the ends of the protrusions may be points or lines. That is, they may assume a cylindrical, prismatic, conical, pyramidal or other suitable shape as long as they protrude on the particle surfaces. Multiple convexities are desirable in order to achieve a high void ratio. The multiple convexities may be formed on part of the particle surface, or may be formed on the entire surface, but are preferably formed on the entire surface in order to achieve a high void ratio. Also, the convexities are preferably formed with equal spacing on the entire surface. The wall surfaces of the convexities and the wall surfaces of the mesopores that open to the outside may be continuous or discontinuous. When the surfaces are continuous, the boundary between the mesopores and the convexities is preferably distinguishable, either because the angle of the wall changes or because the material properties are different or the like. In this way, it is possible to achieve high void ratios that cannot be obtained simply by increasing the diameter or the depth of the mesopores.

The protruding height of the convexities is preferably at least 1 nm but not more than 30 nm. If the protruding height of the convexities is within this range, the convexities are more likely to entangle with one another, and strength can be increased along with the void ratio by bringing the convexities into contact with one another when they are packed densely in a molded article. If the protruding height of the convexities is less than 1 nm, they are unlikely to entangle with one another. If the height exceeds 30 nm, on the other hand, the convexities may structurally inhibit packing of the fine particles, and it may not be possible to pack the fine particles at high densities. In the case of particles with a diameter of 100 nm or less in particular, much higher void ratios and greater strength can be achieved if the protruding height of the convexities is within this range.

The convexities are preferably made from an organic compound, inorganic oxide or metal compound or a composite of these, and are preferably formed principally from a silicon oxide in particular. The fine mesoporous silica particles are made principally of silica (silicon dioxide or another silicon oxide), so by making the convexities principally of silicon oxide, the material strength of the convexities is made to approximate the material strength of the main body of the fine mesoporous silica particles. Thus, even when the convexities of the fine mesoporous silica particles entangle with one other during molding, they are not liable to crushing and other structural damage, and it is easy to achieve a high void ratio after molding.

Thus, when the structure of the fine mesoporous particles includes convexities with wall surfaces separate from those of the mesopores on the fine particle surfaces in addition to the mesopores inside the fine particles, the convexities of the fine mesoporous silica particles entangle with the convexities of adjacent fine mesoporous silica particles when the fine mesoporous silica particles are complexed at high densities with the resin of the matrix, or in other words when the fine mesoporous silica particles are arranged at high densities in a matrix. The convexities contact each other, forming new fine pores between particles separately from the voids of the mesopores. This contact between convexity and convexity links multiple fine mesoporous silica particles. In this way, the strength of the molded article can be increased while also increasing the void ratio.

There are no particular limits on the method of forming the convexities on the fine mesoporous silica particles, but in the aforementioned method of producing fine mesoporous silica particles, convexities can be formed on the particle surfaces by using trimethyl benzene as the hydrophobic part-containing additive. Not only is trimethyl benzene easily incorporated into the micelles to efficiently enlarge the micelle volume, but it is thought that the mesopore walls of the silica in the outermost layer of each particle are split open by the action of the enlarged micelles during hydrolysis, thereby forming convex structures on the particle surface.

The surfaces of the fine mesoporous silica particles are modified with organic functional groups. These organic functional groups are introduced by means of the organosilicon compound used in the mesoporous particle formation step as described above. Functions such as dispersibility and reactivity can be enhanced by introducing organic functional groups.

It is desirable that the organic functional groups modifying the surfaces of the fine mesoporous silica particles be hydrophobic functional groups. It is thus possible to improve dispersibility in the solvent in a liquid dispersion, or dispersibility in the resin in the case of a composition. It is thus possible to obtain a molded article in which the particles are uniformly dispersed. When the fine mesoporous silica particles have convexities as discussed above, the particles have a greater surface area, and are more likely to aggregate by condensation of silanol (Si—OH) groups when they become entangled in the liquid dispersion or the like. Aggregation can be controlled and dispersibility improved by making the particle surfaces hydrophobic. When molding at high densities, moreover, moisture may infiltrate the mesopores and other pores during or after molding, detracting from product quality. Hydrophobic functional groups prevent moisture adsorption, resulting in a high-quality molded article.

The hydrophobic functional groups are not particularly limited, but examples include such hydrophobic organic groups as methyl, ethyl, butyl and other alkyl groups and phenyl and other aromatic groups, as well as fluorine substitution products of these and the like. Preferably, these hydrophobic functional groups are arranged across the surfaces of the mesopores and convexities. It is thus possible to effectively make the particles more hydrophobic and increase dispersibility.

It is also desirable that the organic functional groups modifying the fine mesoporous silica particle surfaces be hydrophilic functional groups. It is thus possible to improve dispersibility in highly polar solvents, and to obtain a composition or molded article in which the particles are uniformly dispersed using a highly polar solvent or resin.

It is also desirable to provide the fine mesoporous silica particles or the surfaces thereof with reactive functional groups. Reactive functional groups generally mean functional groups that react with the matrix-forming resin. The functional groups on the fine particles can form chemical bonds by reacting with the resin forming the matrix, thereby improving the strength of the molded article. When the fine mesoporous silica particles have convexities, moreover, these convexities increase the surface area of the fine mesoporous silica particles, and more of the resin contacts the increased surface area of the fine mesoporous silica particles to form chemical bonds. Thus, the amount of chemical bonds is increased, and the resin and particles adhere more tightly together, providing increased strength.

The reactive functional groups are not particularly limited, but are preferably amino, epoxy, vinyl, isocyanate, mercapto, sulfide, ureido, methacryloxy, acryloxy or styryl groups or the like. With these functional groups it is possible to increase adherence by forming chemical bonds with the resin.

[Liquid Dispersion, Composition, Molded Article]

A liquid dispersion of fine mesoporous silica particles can be prepared by dispersing the aforementioned fine mesoporous silica particles in a medium. Because the fine mesoporous silica particles are uniformly dispersed in the medium in this liquid dispersion of fine mesoporous silica particles, it is easy to obtain an additive having the functions of low refractive index (Low-n), low dielectric constant (Low-k) and low thermal conductivity.

The medium used in the liquid dispersion is not particularly limited, but examples include methanol, ethanol, n-propanol, isopropanol, n-butanol, isobutanol, t-butyl alcohol and other alcohols, diethyl ether, dibutyl ether, tetrahydrofuran, dioxane and other ethers, hexane, heptane, octane and other aliphatic hydrocarbons, benzene, toluene, xylene and other aromatic hydrocarbons, ethyl acetate, butyl acetate and other esters, methylethyl ketone, methylisobutyl ketone and other ketones, and methylene chloride, chloroform and other halogenated carbons and the like.

A composition of fine mesoporous silica particles can be obtained by including the aforementioned fine mesoporous silica particles in a matrix-forming material. A molded article having the functions of low refractive index (Low-n), low dielectric constant (Low-k) and low thermal conductivity can be easily manufactured with this composition of fine mesoporous silica particles. Because the fine mesoporous silica particles are uniformly dispersed in the matrix-forming material in the composition, it is possible to manufacture a uniform molded article.

The matrix-forming material may be any that does not detract from the dispersibility of the fine mesoporous silica particles, without any particular limitations, with examples including polyester resin, acrylic resin, urethane resin, vinyl chloride resin, epoxy resin, melamine resin, fluorine resin, silicone resin, butyral resin, phenol resin, vinyl acetate resin and the like, and these may also be ultraviolet curable resins, thermosetting resins, electron beam curable resins, emulsion resins, water-soluble resins or hydrophilic resins, mixtures of these, co-polymers or modified forms of these resins, or alkoxysilanes or other hydrolysable silicon compounds or the like. Additives may also be added to the composition as necessary. Examples of additives include luminous materials, conductive materials, color-forming materials, fluorescent materials, viscosity-adjusting materials, resin curing agents, resin curing accelerators and the like.

A molded article of fine mesoporous silica particles can be obtained by molding using the aforementioned composition of fine mesoporous silica particles. It is thus possible to obtain a molded article having the functions of low refractive index (Low-n), a low dielectric constant (Low-k) and low thermal conductivity. Since the fine mesoporous silica particles have good dispersibility, moreover, these particles are uniformly arranged in the matrix in the molded article, resulting in a molded article with little variation in performance.

The method of preparing the molded article containing fine mesoporous silica particles is not particularly limited as long as it is capable of forming a composition containing fine mesoporous silica particles into any shape, and examples include printing, coating, extrusion molding, vacuum molding, spray molding, laminate molding, transfer molding, foamed molding and the like.

When coating on the surface of a substrate, the method is also not particularly limited, but various ordinary coating methods can be selected such as brush coating, spray coating, dipping (dip coating), roll coating, flow coating, curtain coating, knife coating, spin coating, table coating, sheet coating, leaf coating, die coating, bar coating, doctor blade coating and the like. A method such as cutting or etching can be used to work a piece into a desired shape.

In a molded article, the fine mesoporous silica particles preferably have chemical bonds with the matrix-forming material. This allows the fine mesoporous silica particles to adhere more strongly to the resin. Furthermore, when the fine mesoporous silica particles have convexities their surface area is increased, and more chemical bonds are formed on the surfaces of the fine particles when the mesoporous silica is arranged in the resin, increasing the strength of adhesion between the fine mesoporous silica particles and the resin to thereby further improve the strength of the molded article.

The structure of the chemical bonds is not particularly limited as long as the functional groups serve to chemically bond the fine mesoporous silica particles and matrix-forming material on the surfaces of both, but if one side has amino groups, the other preferably has isocyanate, epoxy, vinyl, carbonyl or Si—H groups or the like, and in this case chemical bonds can be easily formed by a chemical reaction.

When the fine mesoporous silica particles have convexities, the particles are preferably linked in the molded article. This means that the surfaces of multiple fine mesoporous silica particles contact each other, linking the particles together. Pores can thus be formed by the entanglement of convexities between particles without any loss of strength, resulting in a higher void ratio of the molded article. In this case, the convexities are more likely to entangle if the fine particles are contained in the molded article in the amount of 10 vol % or more. However, if the volume ratio occupied by the fine particles exceeds 80 vol % the amount of matrix-forming material will be much lower, making it difficult to form a complex by bonding between the resin and fine particles and potentially detracting from the strength of the molded article, so the volume percentage of fine particles is preferably 80 vol % or less.

The fine mesoporous silica particles are preferably linked by chemical bonds. Pores can thus be formed by entanglement of convexities between particles, while the strength of the molded article is improved by the chemical bonds, resulting in a molded article that is strong as well as having a high void ratio. The chemical bonds are formed by the chemical reaction of functional groups on the fine particle surfaces. The type of functional groups and the type of reaction are not particularly limited, but reactive functional groups such as those described above can be used.

The molded body is preferably provided with one or two or more of the functions of high transparency, low dielectric constant, low refractive index and low thermal conductivity. A high-quality device can be manufactured if the molded article provides any of the functions of high transparency, a low dielectric constant, a low refractive index and low thermal conductivity. A multifunctional molded article can be obtained if two or more of these functions are provided, making it possible to manufacture a device that requires multifunctionality. That is, a molded article containing fine mesoporous silica particles has the properties of excellent uniformity, high transparency, low refractive index (Low-n), low dielectric constant (Low-k) and low thermal conductivity.

EXAMPLES

The present invention is explained in detail below using examples.

Preparation of Fine Mesoporous Silica Particles

Example 1

Synthesis of Surfactant Composite Fine Silica Particles 120 g of $H_2O$, 5.4 g of 25% $NH_3$ aqueous solution, 20 g of ethylene glycol, 1.2 g of hexadecyl trimethyl ammonium bromide (CTAB), 13.43 g of 1,3,5-triisopropyl benzene (TIPB) (TIPB/CTAB mass ratio=20), 1.29 g of TEOS, and 0.23 g of γ-aminopropyl triethoxysilane were mixed in a separable flask with an attached cooling tube, agitator and thermometer, and agitated for 4 hours at 60° C. to prepare surfactant composite fine silica particles.

Mesoporous Particle Formation Step and Preparation of Liquid Dispersion:

30 g of isopropanol, 60 g of 5N—HCl and 26 g of hexamethyl disiloxane were mixed and agitated at 72° C., and the aforementioned synthesis reaction solution of surfactant composite fine silica particles was added and agitated and refluxed for 30 minutes. These operations served to extract the surfactant and hydrophobic part-containing additive from the surfactant composite fine silica particles, to yielding fine mesoporous silica particles with trimethylsilylated particle surfaces.

After trimethylsilylation, the solution was centrifuged for 20 minutes at 20,000 rpm to remove the liquid. Ethanol was added to the precipitated solid phase, and the particles were shaken in ethanol with a shaker to clean the fine mesoporous silica particles. This was centrifuged for 20 minutes at 20,000 rpm to remove the liquid and obtain fine mesoporous silica particles.

3.8 g of isopropanol was added to 0.2 g of the resulting fine mesoporous silica particles, which were then re-dispersed with a shaker to obtain fine mesoporous silica particles dispersed in isopropanol. The particle diameter of the fine mesoporous silica particles based on TEM observation was about 60 nm. This liquid dispersion showed no precipitation even after 3 months, confirming that dispersibility was maintained.

Example 2

Surfactant composite fine silica particles were prepared under the same conditions as in Example 1 except that 1.58 of 1,3,5-trimethyl benzene (TMB) (TMB/CTAB mass ratio=4) was used instead of 13.43 g of 1,3,5-triisopropyl benzene (TIPB) (TIPB/CTAB mass ratio=20), and the template (surfactant and hydrophobic part-containing additive) was extracted to obtain fine mesoporous silica particles with trimethylsilylated surfaces. When the particles were washed and dispersed in isopropanol under the same conditions as in Example 1, they showed no precipitation even after 3 months, confirming that dispersibility was maintained. The particle diameter of the fine mesoporous silica particles based on TEM observation was about 50 nm.

Example 3

A synthesis liquid of surfactant composite fine silica particles was prepared under the same conditions as in Example 2 except that no ethylene glycol was added, and the template (surfactant and hydrophobic part-containing additive) was extracted to obtain fine mesoporous silica particles with trimethylsilylated surfaces. When the particles were washed and dispersed in isopropanol under the same conditions as in Example 1, they showed no precipitation even after 3 months, confirming that dispersibility was maintained. The particle diameter of the fine mesoporous silica particles based on TEM observation was about 60 nm.

Example 4

A synthesis liquid of surfactant composite fine silica particles was prepared under the same conditions as in Example 2 except that 39.3 g of hexaethyl disiloxane was used instead of 26 g of hexamethyl disiloxane in the mesoporous particle formation step, and the template was then extracted to obtain fine mesoporous silica particles. When the fine mesoporous silica particles were washed under the same conditions as in Example 1 using 1-butanol instead of isopropanol and dispersed in 1-butanol, they showed no precipitation even after 3 months, confirming that dispersibility was maintained.

Example 5

A synthesis liquid of surfactant composite fine silica particles was prepared under the same conditions as in Example 2 except that 57.4 g of 1,3-n-octyltetramethyl disiloxane was used instead of 26 g of hexamethyl disiloxane in the mesoporous particle formation step, and the template was extracted to obtain fine mesoporous silica particles. When the fine mesoporous silica particles were washed under the same conditions as in Example 1 using 1-butanol instead of isopropanol and dispersed in 1-butanol, they showed no precipitation even after 3 months, confirming that dispersibility was maintained.

Example 6

A synthesis liquid of surfactant composite fine silica particles was prepared under the same conditions as in Example 2 except that 24.5 g of 1,3-bis(3-carboxypropyl)tetramethyl disiloxane and 13 g of hexamethyl disiloxane were used instead of 26 g of hexamethyl disiloxane in the mesoporous particle formation step, and the template was extracted to obtain fine mesoporous silica particles. When the fine mesoporous silica particles were washed under the same conditions as in Example 1 and dispersed in isopropanol, they showed no precipitation even after 3 months, confirming that dispersibility was maintained.

Example 7

A synthesis liquid of surfactant composite fine silica particles was prepared under the same conditions as in Example 2 except that 66.2 g of bis(tridecafluoro-1,1,2,2-tetrahydrooctyl)tetramethyl disiloxane and 13 g of hexamethyl disiloxane were used instead of 26 g of hexamethyl disiloxane in the mesoporous particle formation step, and the template was extracted to obtain fine mesoporous silica particles. When the fine mesoporous silica particles were washed under the same conditions as in Example 1 and dispersed in isopropanol, they showed no precipitation even after 3 months, confirming that dispersibility was maintained.

Example 8

A synthesis liquid of surfactant composite fine silica particles was prepared under the same conditions as in Example 2 except that 29.8 g of 1,3-divinyltetramethyl disiloxane was used instead of 26 g of hexamethyl disiloxane in the mesoporous particle formation step, and the template was extracted to obtain fine mesoporous silica particles. When the fine mesoporous silica particles were washed under the same conditions as in Example 1 and dispersed in 1-butanol, they showed no precipitation even after 3 months, confirming that dispersibility was maintained.

Example 9

A synthesis liquid of surfactant composite fine silica particles was prepared under the same conditions as in Example 2 except that 45.9 g of 1,3-diphenyltetramethyl disiloxane was used instead of 26 g of hexamethyl disiloxane in the mesoporous particle formation step, and the template was extracted to obtain fine mesoporous silica particles. When the fine mesoporous silica particles were washed under the same conditions as in Example 1 using orthoxylene instead of isopropanol, and then dispersed in orthoxylene, they showed no precipitation even after 3 months, confirming that dispersibility was maintained.

Comparative Example 1

A synthesis liquid of surfactant composite fine silica particles was prepared under the same conditions as in Example 2 except that no 1,3,5-trimethylbenzene was used in synthesizing the surfactant composite fine silica particles. The template was then extracted under the same conditions as in Example 2 except that no hexamethyl disiloxane was added, and the particles were washed to obtain fine mesoporous silica particles. These fine mesoporous silica particles were dispersed in isopropanol. After 3 days, sediment appeared on the lower surface of this liquid dispersion, indicating particle aggregation and a decrease in dispersibility. The particle diameter of these fine mesoporous silica particles was about 80 nm.

Comparative Example 2

A synthesis liquid of surfactant composite fine silica particles was prepared under the same conditions as in Example 2 except that no 1,3,5-trimethylbenzene was used in synthesizing the surfactant composite fine silica particles, the template was extracted, and the particles were washed to obtain fine mesoporous silica particles with trimethylsilylated surfaces. These fine mesoporous silica particles were dispersed in isopropanol. The particle diameter of these fine mesoporous silica particles was about 80 nm.

[Structural Comparison of Fine Mesoporous Silica Particles]

The fine mesoporous silica particles of Examples 1 to 9 and Comparative Examples 1 and 2 were heat treated for 2 hours at 150° C. to obtain dry powders that were then subjected to nitrogen adsorption measurement, X-ray diffraction analysis and FT-IR measurement.

(Nitrogen Adsorption Measurement)

Figure 5:
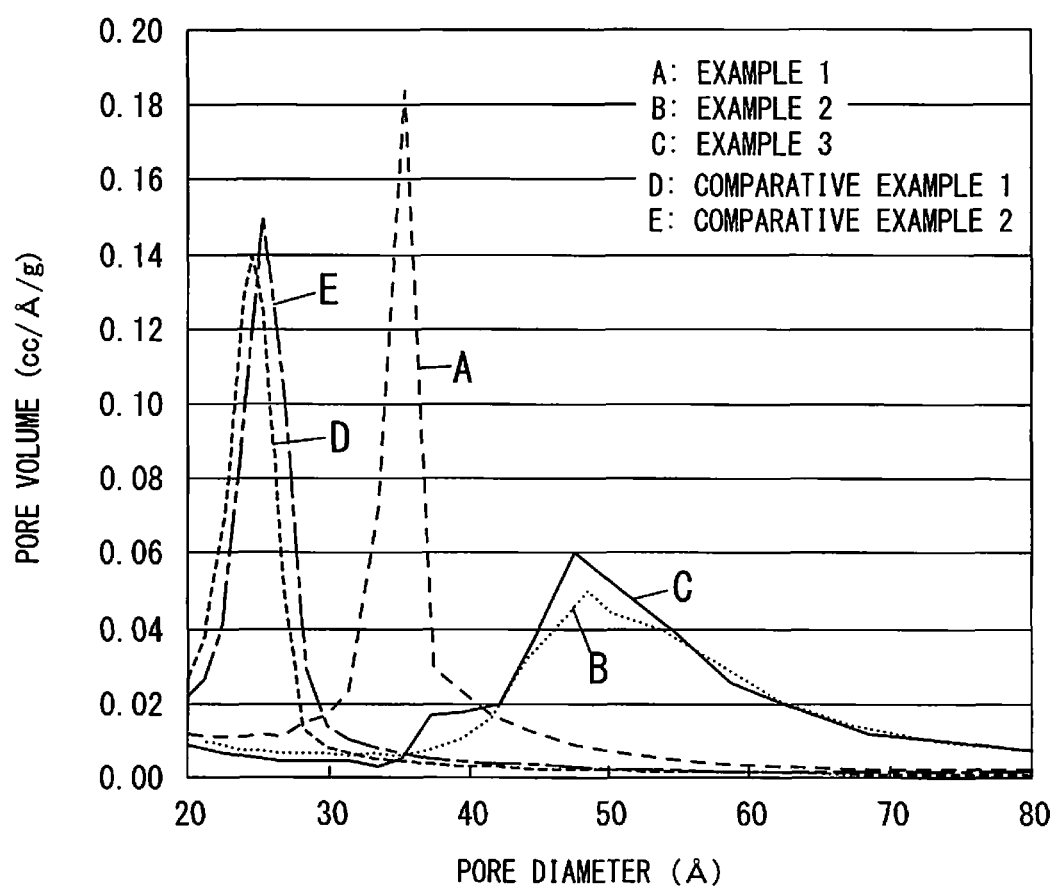
FIG. 5 is a graph showing the pore diameter distributions of the fine mesoporous silica particles obtained in Examples 1 to 3 and Comparative Examples 1 and 2.

The adsorption isotherm was calculated with an Autosorb-3 (Quantachrome Co.). The pore diameter distribution was obtained by the BJH analysis method. The results for Examples 1 to 3 and Comparative Examples 1 and 2 are shown in FIG. 5. The pore diameters as determined from the graph distributions are shown in Table 1.

The peak top pore diameter of the particles of Example 1 was about 3.6 nm, while the peak top pore diameters of the particles of Examples 2 and 3 were each about 5 nm. The peak top pore diameters of the particles of Comparative Examples 1 and 2 were each about 2.5 nm. That is, the pore diameters of the particles of the examples was confirmed to be larger than those of the comparative examples. In terms of pore volume, the difference between the total pore volume of the fine mesoporous silica particles of Examples 1 to 3 and the total pore volume of the fine mesoporous silica particles of Comparative Examples 1 and 2 was not as great as the difference in pore diameter, confirming that the particles had higher void ratios.

In Examples 2 and 3, the left-right symmetry in the peak shape of the pore diameter distribution was low, and in particular the pore volume on the right side of the peak (wherein the pore diameter was larger) was greater than on the left side of the peak (wherein the pore diameter was smaller). When a pore distribution lacks regularity (left-right symmetry) in this way, it means that multiple types of pores are present. The dried powders of fine mesoporous silica particles were confirmed to have pores other than the uniform mesopores inside the particles. These pores other than mesopores are the pores formed between fine mesoporous silica particles, resulting from entanglement of the convexities formed on the surfaces of the fine particles. The results for Examples 4 to 9 were roughly the same as for Example 2.

TABLE 1

| | Pore diameter (nm) | Pore volume (cc/g) |
| --- | --- | --- |
| Example 1 | 3.6 | 1.5 |
| Example 2 | 5.0 | 1.9 |
| Example 3 | 4.9 | 1.9 |
| Comparative Ex. 1 | 2.5 | 1.2 |
| Comparative Ex. 2 | 2.6 | 1.3 |

(X-Ray Diffractometry)

Figure 6:
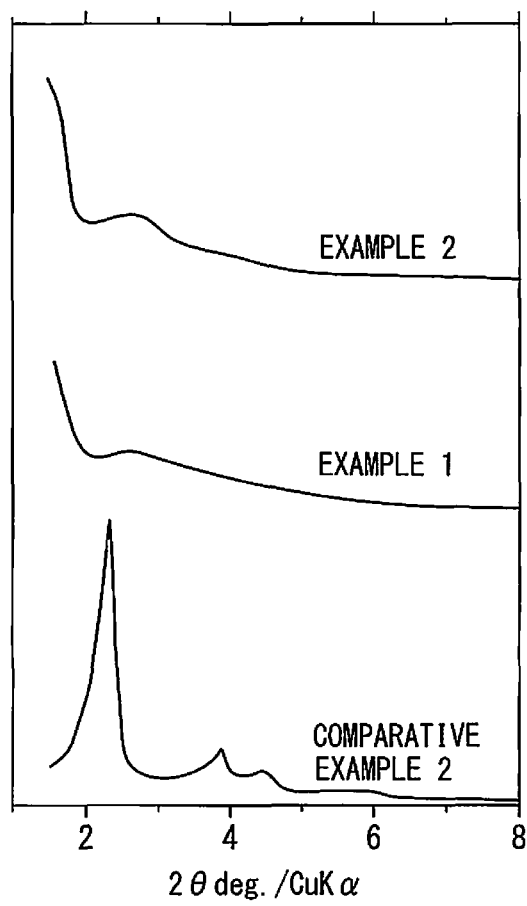
FIG. 6 is a chart showing the results of X-ray diffraction measurement of the fine mesoporous silica particles obtained in Examples 1 and 2 and Comparative Example 2.
Figure 7:
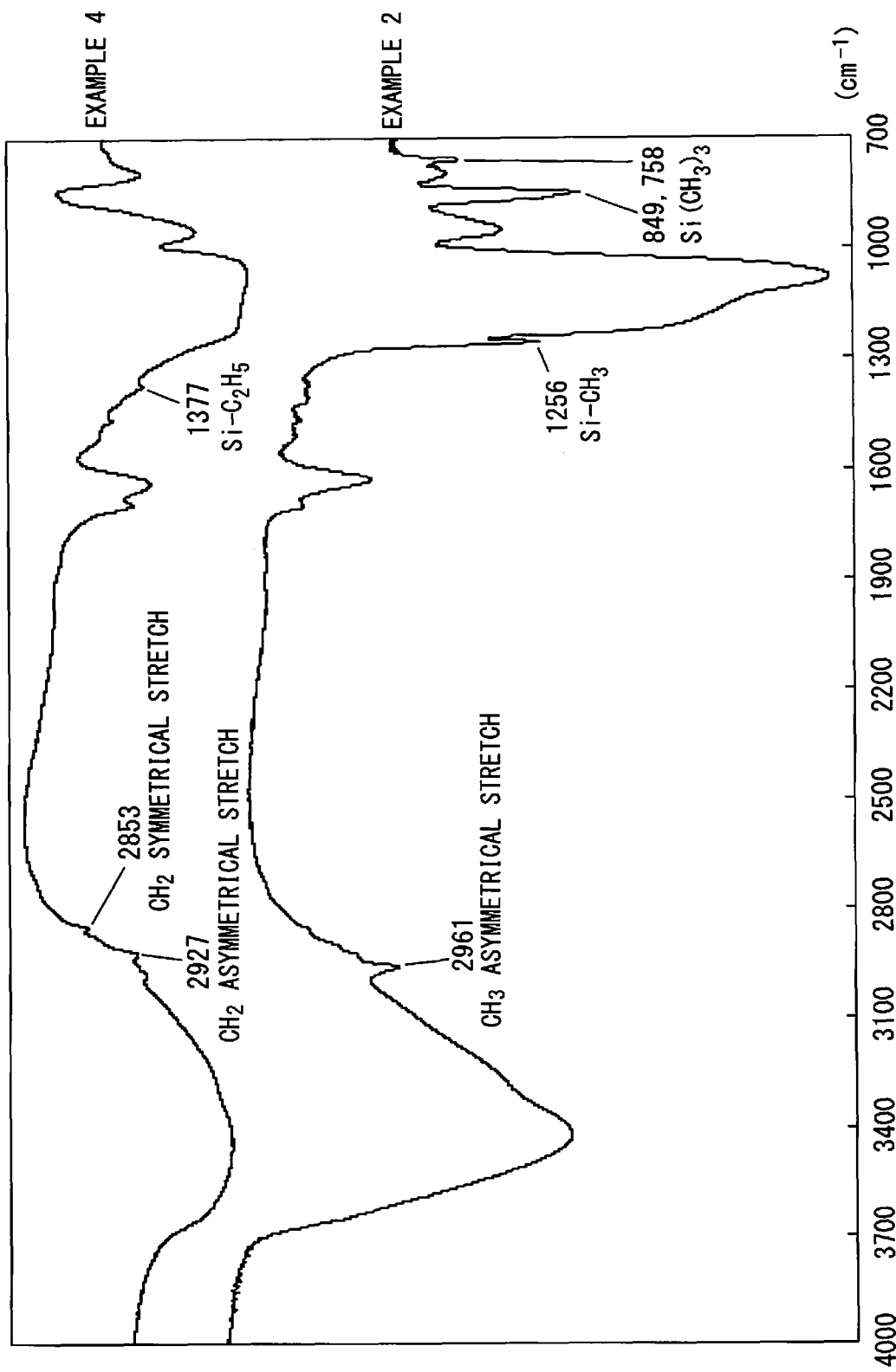
FIG. 7 shows the infrared absorption spectra of the fine mesoporous silica particles obtained in Examples 2 and 4.
Figure 8:
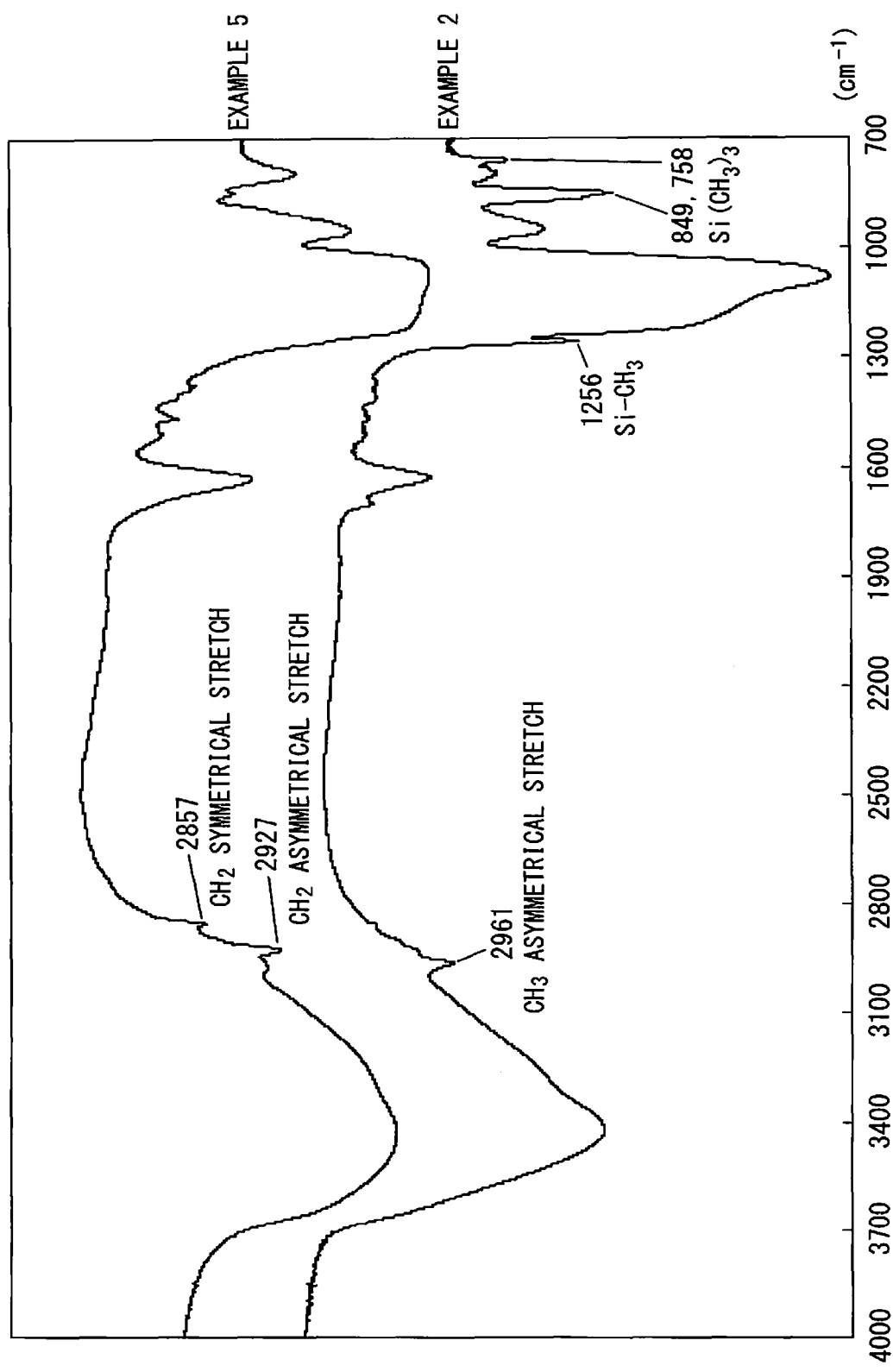
FIG. 8 shows the infrared absorption spectra of the fine mesoporous silica particles obtained in Examples 2 and 5.
Figure 9:
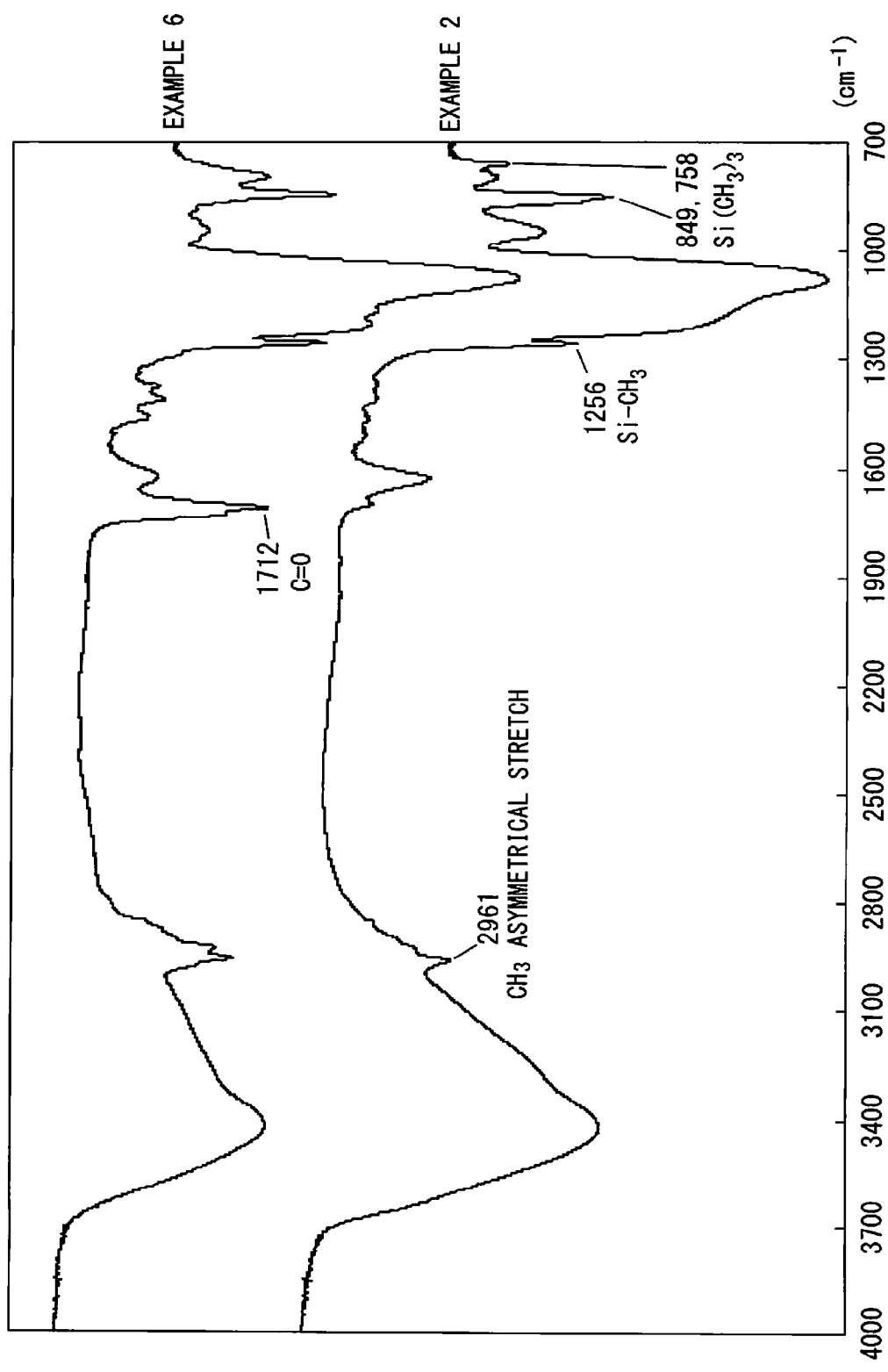
FIG. 9 shows the infrared absorption spectra of the fine mesoporous silica particles obtained in Examples 2 and 6.
Figure 10:
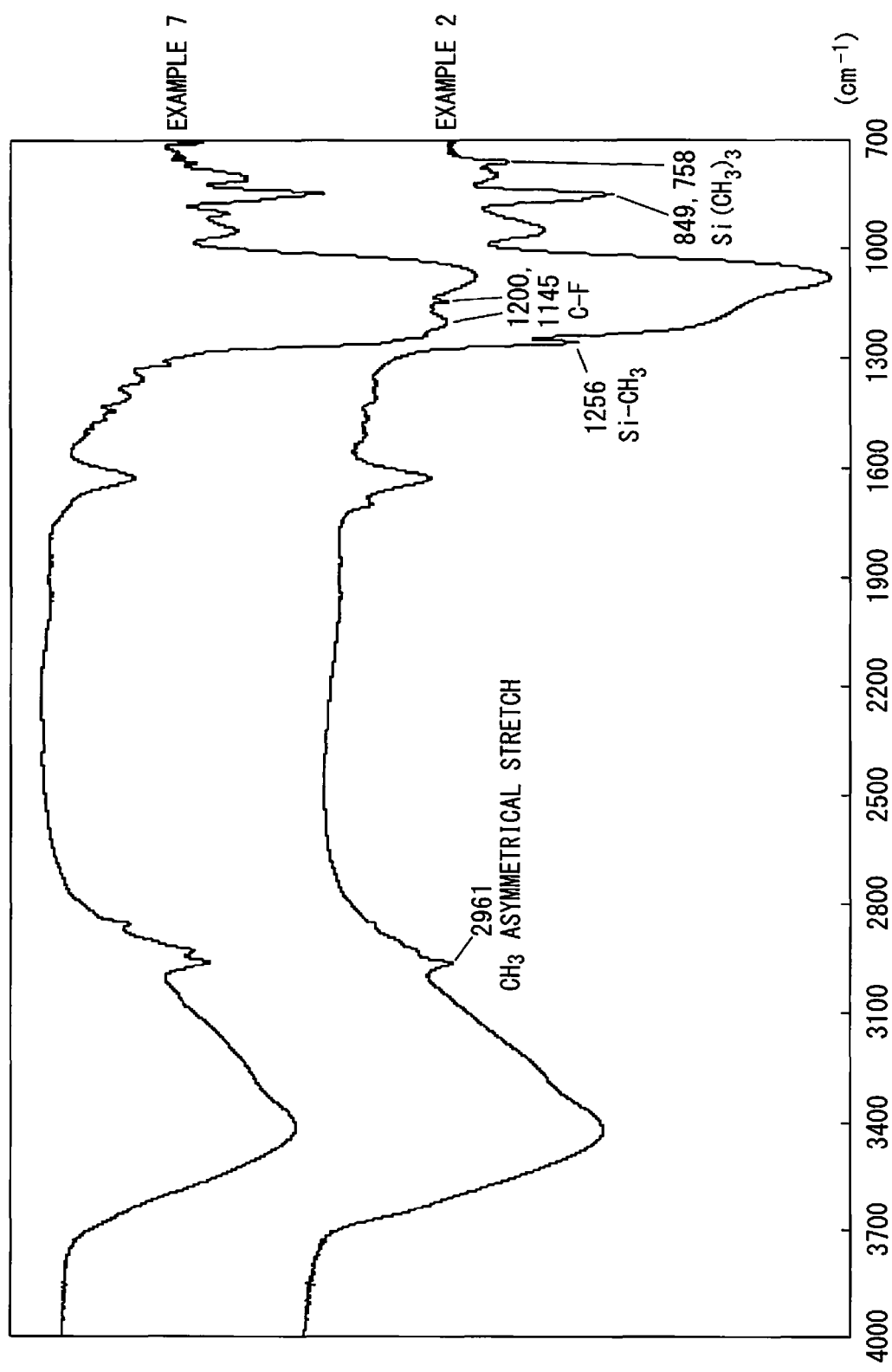
FIG. 10 shows the infrared absorption spectra of the fine mesoporous silica particles obtained in Examples 2 and 7.
Figure 11:
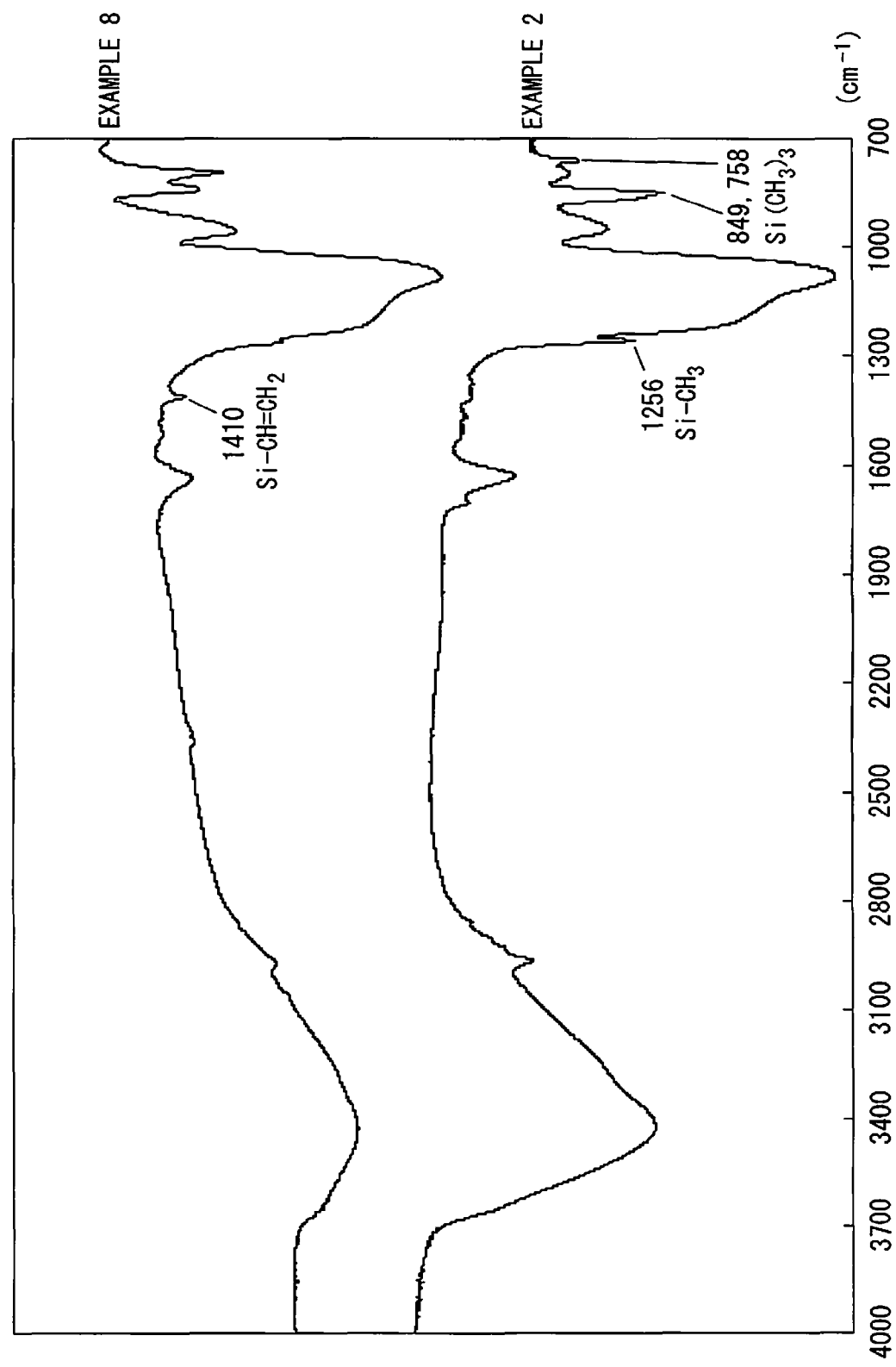
FIG. 11 shows the infrared absorption spectra of the fine mesoporous silica particles obtained in Examples 2 and 8.
Figure 12:
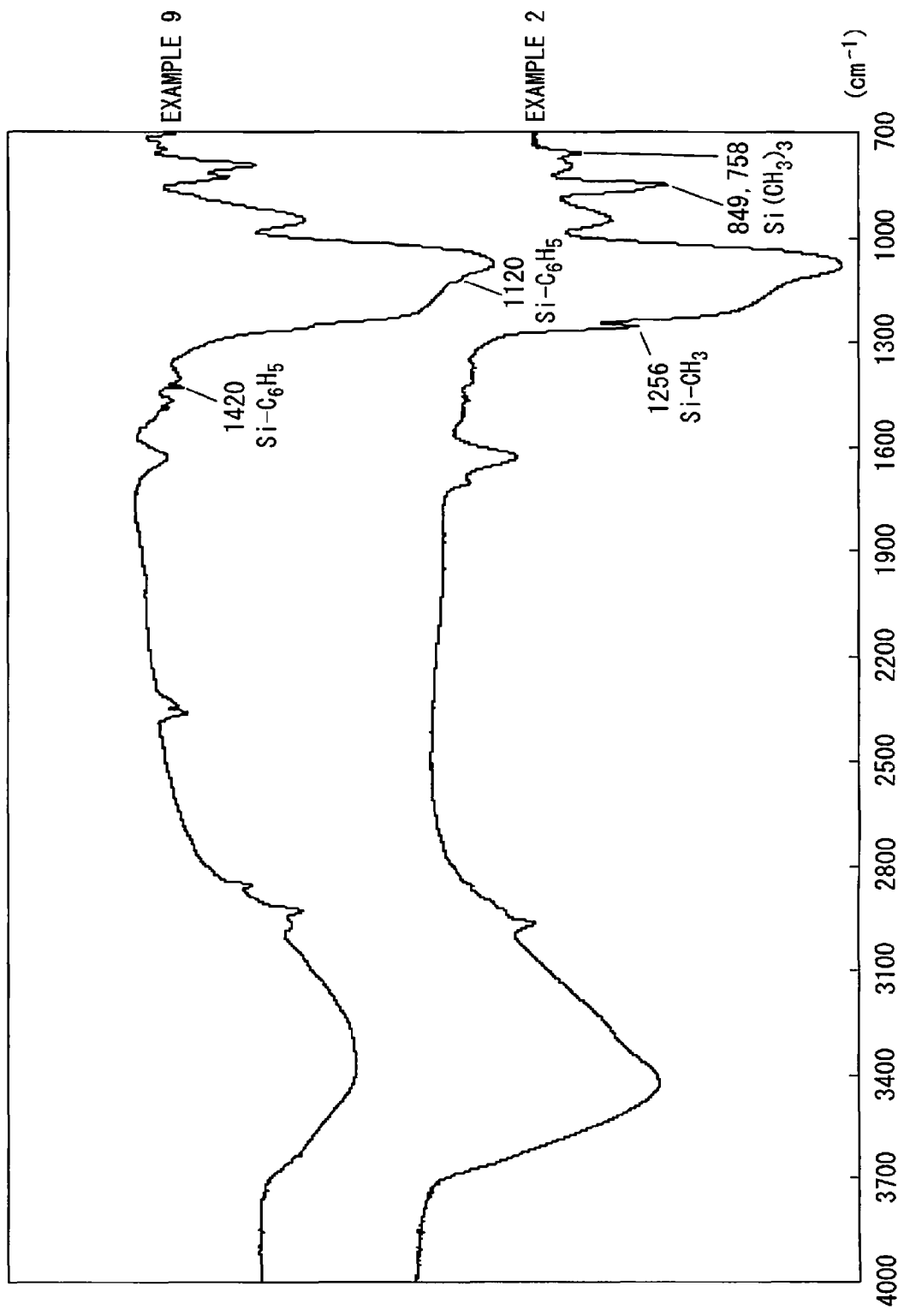
FIG. 12 shows the infrared absorption spectra of the fine mesoporous silica particles obtained in Examples 2 and 9.

X-ray diffractometry was performed on the fine mesoporous silica particles of the examples and comparative examples, using an AXS MO3X-HF (Bruker). FIG. 6 shows the measurement results for the fine mesoporous silica particles of Examples 1 and 2 and Comparative Example 2. Peaks attributable to regular structures of mesopores were confirmed in all of the fine mesoporous silica particles of Examples 1 to 9 and Comparative Examples 1 and 2. The peaks of Examples 1 to 9 exhibited a low angle shift in comparison with Comparative Examples 1 and 2, indicating an increase in surface separation accompanying mesopore enlargement. The measurement results for Examples 4 to 9 were roughly the same as for Example 2.

(TEM Observation)

Figure 3:
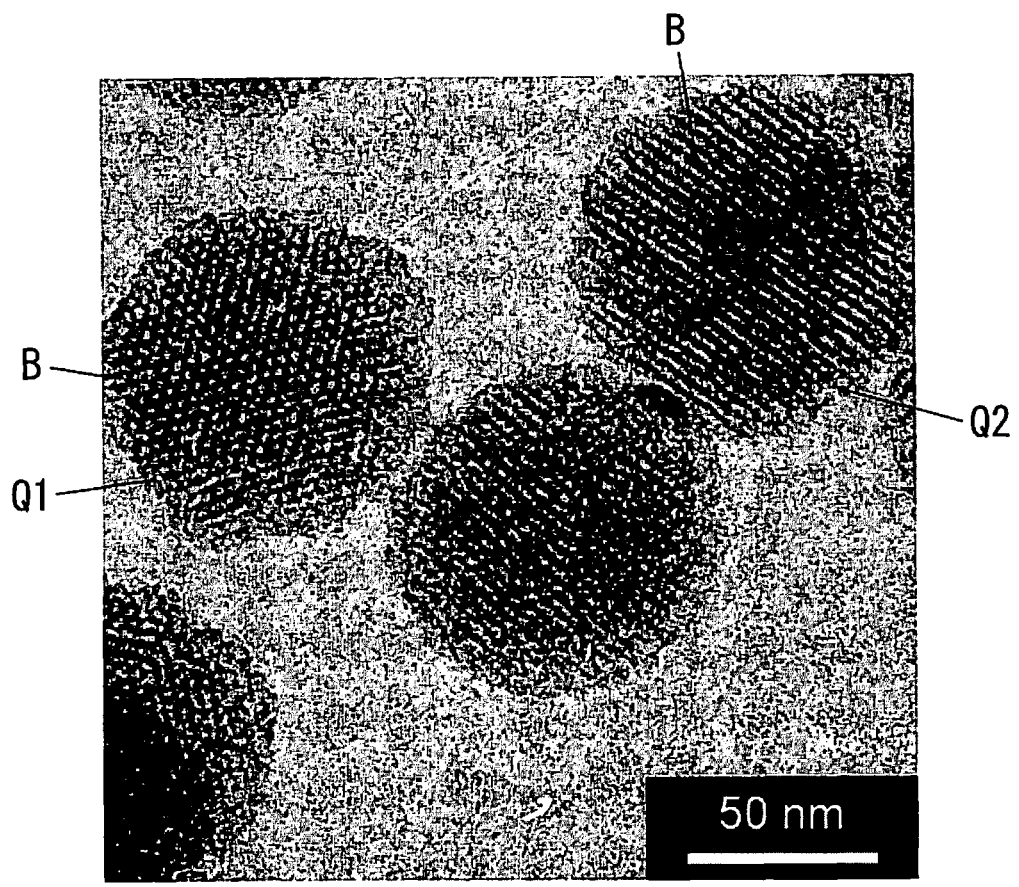
FIG. 3 is a TEM image of the fine mesoporous silica particles obtained in Comparative Example 2.

The fine structures of the fine mesoporous silica particles of Example 2 and Comparative Example 2 were observed by TEM using a JEM 2000EXII (JEOL). FIG. 1 shows a TEM image for Example 2, and FIG. 3 shows a TEM image for Comparative Example 2. Two-dimensional hexagonal structures were confirmed in Example 2 and Comparative Example 2, and the mesopores B were confirmed to be larger in Example 2 than in Comparative Example 2. In the TEM image of Example 2, moreover, the presence of convexities A formed with a convex structure was confirmed on the surfaces of the fine mesoporous silica particles.

Figure 2A:
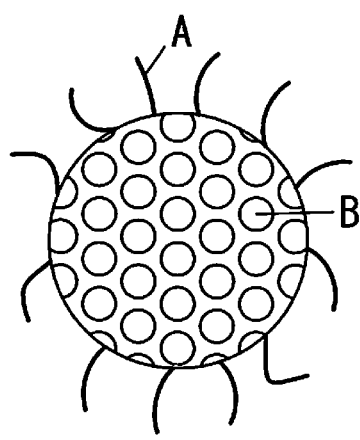
FIGS. 2A and 2B are model views of the fine mesoporous silica particles obtained in Example 2, illustrating one example of fine mesoporous silica particles of the present invention.
Figure 2B:
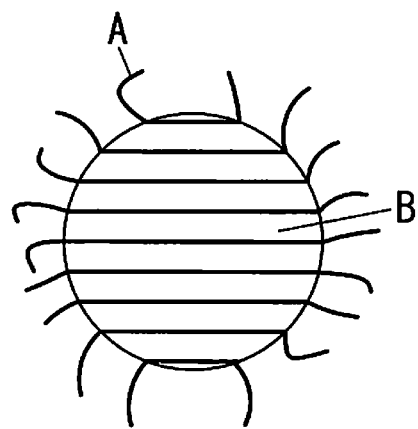
Figure 4A:
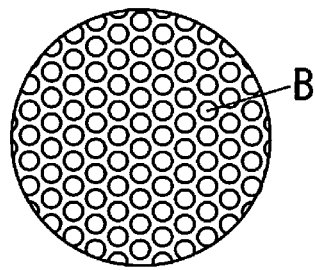
FIGS. 4A and 4B are model views of fine mesoporous silica particles observed in Comparative Example 2.
Figure 4B:
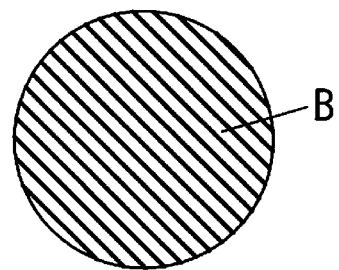

FIG. 2 is a model view of a fine mesoporous silica particle observed in Example 2. FIG. 2A shows the particle as seen from the open ends of the mesopores, corresponding to particle P1 in FIG. 1. FIG. 2B shows the particle as seen from a direction perpendicular to the open ends of the mesopores, with the particle rotated 90° around an axis formed in the vertical direction in FIG. 2A, corresponding to particle P2 in FIG. 1. Since the mesopore structure inside each particle can be observed with the transmission microscope, the model view appears as shown. As shown in this model view, the mesopores B pass completely through the interior of the particle, while convexities A project towards the outside from the surface of the particle. The mesopores B are also arrayed regularly inside the particle. The mesopores B in the fine mesoporous silica particles of Example 2 pass through the particles in cylindrical form, and in the TEM image of FIG. 1 the particles appear differently depending on the orientation of mesopores B in the particle. FIGS. 4A and 4B show model views of particles Q1 and Q2 in FIG. 3.

In Example 2 the projecting height of the convexities is about 5 nm, and the convexities were confirmed to be planar or threadlike, with a thickness of about 2 nm. Thus, it was confirmed that these convexities entangle when multiple fine mesoporous silica particles are superimposed, forming new pores distinct from the mesopores.

(FT-IR Measurement)

The infrared absorption spectra in Examples 1 to 9 were measured with a FT/IR-670 Plus (JASCO) to confirm the functional groups on the particle surfaces. FIGS. 7 to 12 show the infrared absorption spectra of the fine mesoporous silica particles obtained in Example 2 and Examples 4 to 9. For purposes of comparison, each spectrum is shown next to that of Example 2, which had introduced trimethylsilyl groups, and each spectrum exhibits characteristic absorption. The spectra for Examples 1 and 3 are roughly the same as for Example 2. The figures show absorption spectra characteristic of the organic functional groups of organosilicon compounds having siloxane bonds in the molecule, confirming trimethylsilyl groups in Example 2, ethyl groups in Example 4, an increase in the $CH_2$ peak in Example 5, an increase in the C=O peak in Example 6, C—F in Example 7, vinyl groups in Example 8, and phenyl groups in Example 9. It was thus confirmed that fine mesoporous silica particles having various organic functional groups on the surface were formed using organosilicon compounds having siloxane bonds in the molecule.

Preparation of Antireflective Films

Example A1

An isopropanol dispersion of the fine mesoporous silica particles prepared in Example 2 was mixed and complexed with a silica matrix precursor, and formed as a film on a glass substrate to prepare an antireflective film.

Methyl silicate oligomer (MS51, Mitsubishi Chemical) was used as the silica matrix precursor. The aforementioned isopropanol dispersion of fine mesoporous silica particles was added to the precursor solution to a mass ratio of 30/70 (as solids) of fine mesoporous silica particles to silica (based on the condensed compound), and this was diluted with isopropanol and trace amounts of butyl Cellosolve and butyl acetate to a total solids content of 2.3 mass % to obtain a coating liquid for film formation.

This coating liquid for film formation was applied with a bar coater to a glass substrate with a minimum reflectance of 4.34, and dried for 5 minutes at 120° C. to form a film (antireflective film) about 100 nm thick.

Example A2

An isopropanol dispersion of the fine mesoporous silica particles prepared in Example 7 was mixed and complexed with a silica matrix precursor under the same conditions used for preparing the antireflective film of Example A1, and coated on a glass substrate to prepare a film (antireflective film).

Comparative Example A1

An isopropanol dispersion of the fine mesoporous silica particles prepared in Comparative Example 1 was complexed with a silica matrix precursor under the same conditions used for preparing the antireflective film of Example A1, and coated on a glass substrate to prepare a film.

Comparative Example A2

An isopropanol dispersion of the fine mesoporous silica particles prepared in Comparative Example 2 was complexed with a silica matrix precursor under the same conditions used for preparing the antireflective film of Example A1, and coated on a glass substrate to prepare a film.

Comparative Example A3

Instead of the isopropanol dispersion of fine mesoporous silica particles used to prepare the antireflective film of Example A1, an isopropanol-dispersed sol of hollow silica (solids 20%, average primary particle diameter about 60 nm, shell thickness about 10 nm, Shokubai Kasei Kogyo) was complexed with a silica matrix precursor under the same conditions used in preparing the antireflective film of Example A1, and coated on a glass substrate to prepare a film.

[Comparison of Antireflective Films]

Figure 13:
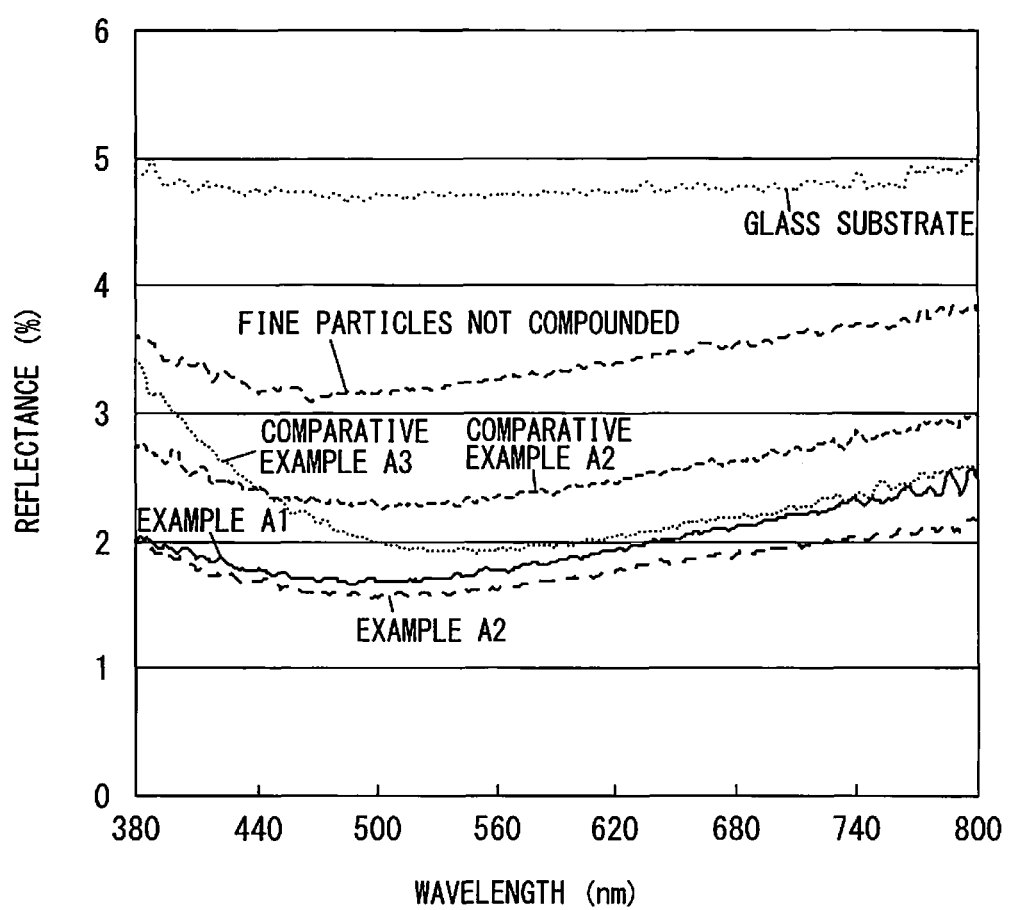
FIG. 13 is a graph showing the reflective properties of the anti-reflective films obtained in Examples A1 and A2 and Comparative Examples A2 and A3.

The haze rates, reflectance values and mechanical strengths of the films (composite thin films) of Example A1 and Comparative Examples A1 to A3 were measured, and film performance was evaluated. FIG. 13 is a graph showing the results for Example A1, Comparative Examples A2 and A3. The results for reflectance of a glass substrate and a film without compounded fine mesoporous silica particles are shown for purposes of comparison. The other results are summarized in Table 2.

(5° Relative Reflectance)

Reflectance was measured at wavelengths of 380 to 800 nm using a spectrophotometer (Hitachi "U-4100"), and the smallest value in that range was given as the minimum reflectance.

(Haze)

The haze rate was measured using a haze meter (Nippon Denshoku "NDH 2000").

(Mechanical Strength)

The surface of the antireflective film was abraded 10 times back and forth with #0000 steel wool with a load of 250 g, and the film was rated "×" if the number of marks on the antireflective film was 51 or more, "Δ" if the number was 11 to 50 and "○" if the number was 0 to 10.

TABLE 2

|  | Haze | Minimum reflectance (%) | Mechanical strength |
|---|---|---|---|
| Example A1 | 0.47 | 1.65 | ○ |
| Example A2 | 0.35 | 1.55 | ○ |
| Comp. Ex. A1 | 1.96 | 2.18 | X |
| Comp. Ex. A2 | 0.69 | 2.26 | ○ |
| Comp. Ex. A3 | 0.72 | 1.91 | X |

It can be seen from FIG. 13 that Examples A1 and A2 have superior low-reflectance properties, with low reflectance values across the entire visible light range. As shown in Table 2, Examples A1 and A2 have the lowest haze and reflectance values and also greater surface strength in comparison with Comparative Examples A1 to A3, which have fine mesoporous silica particles compounded in the same proportions by weight. These results show that a lower refractive index can be achieved by increasing the amount of voids in an antireflective film using fine mesoporous silica particles. The fact that mechanical strength is not diminished despite the larger amount of voids is due to entanglement of convexities between particles. The reason why Example A1 has the best results for haze is that sufficient trimethylsilyl groups are provided on the surface of the fine mesoporous silica particles, improving dispersibility and suppressing particle aggregation in the liquid dispersion and thin film, so that the fine mesoporous silica particles are arranged in a dispersed state inside the film. The reason why Example A2 has a similar haze value as Example A1 is that dispersibility is improved because it has silyl groups with tridecafluorooctyl groups on the particle surfaces, thereby suppressing particle aggregation in the liquid dispersion and thin film so that the fine mesoporous silica particles are arranged in a dispersed state inside the film. The reflectance and haze of Example A2 are slightly lower than those of Example A1 because the tridecafluorooctyl groups lower the refractive index inside the film.

The invention claimed is:

1. Fine mesoporous silica particles with a plurality of mesopores, comprising a plurality of convexities on particle surfaces of the fine mesoporous silica particles, wherein the fine mesoporous silica particles are modified on surfaces thereof with organic functional groups via siloxane bonds, the convexities are formed by protrusions of particle components and have wall surfaces separate from wall surfaces of the mesopores, the convexities are made principally of silicon oxide, a protruding height of the convexities is at least 1 nm but not more than 30 nm and the fine mesoporous silica particles are obtained by the method comprising:
preparing a surfactant composite fine silica particle in which a surfactant, water, an alkali and a hydrophobic part-containing additive including a hydrophobic part for increasing a volume of micelles are mixed with a silica source to thereby prepare surfactant composite fine silica particles; and
forming a mesoporous particle in which the surfactant composite fine silica particles are mixed with an acid and an organosilicon compound having a siloxane bond in a molecule to thereby remove the surfactant and hydrophobic part-containing additive from the surfactant composite fine silica particles and provide a surface of each silica fine particle with an organic functional group via siloxane bonds.

2. Fine mesoporous silica particles with a plurality of mesopores, comprising a plurality of convexities on particle surfaces of the fine mesoporous silica particles, wherein:
the fine mesoporous silica particles are modified on surfaces thereof with organic functional groups via siloxane bonds;
the convexities are formed by protrusions of particle components and have wall surfaces separate from wall surfaces of the mesopores;
the convexities are made principally of silicon oxide; and
a protruding height of the convexities is at least 1 nm but not more than 30 nm.

3. The fine mesoporous silica particles according to claim 2, wherein the fine mesoporous silica particles have a particle diameter of 100 nm or less.

4. A liquid dispersion of fine mesoporous silica particles, comprising the fine mesoporous silica particles according to claim 2 dispersed in a medium.

5. A composition containing fine mesoporous silica particles, the composition comprising the fine mesoporous silica particles according to claim 2 in a matrix-forming material.

6. A molded article containing fine mesoporous silica particles, obtained by molding the composition containing fine mesoporous silica particles according to claim 5.

7. The fine mesoporous silica particles according to claim 2, wherein the plurality of mesopores are 3.5 nm or more in diameter.

8. The fine mesoporous silica particles according to claim 2, wherein the plurality of mesopores are equally spaced inside each particle.

9. The fine mesoporous silica particles according to claim 2, wherein
the fine mesoporous silica particles have a particle diameter of 100 nm or less;
the plurality of mesopores are 3.5 nm or more in diameter; and
the plurality of mesopores are equally spaced inside each particle.

10. The fine mesoporous silica particles according to claim 2, wherein
the wall surfaces of the convexities and the wall surfaces of the mesopores are discontinuous; or
the wall surfaces of the convexities and the wall surfaces of the mesopores are continuous and angles of the walls change at boundaries between the mesopores and the convexities.

* * * * *